(12) United States Patent
Nam et al.

(10) Patent No.: US 6,560,854 B2
(45) Date of Patent: May 13, 2003

(54) COIL-WINDING METHOD FOR ELECTRIC MOTOR, GENERATOR AND ALTERNATOR

(75) Inventors: Sang S. Nam, Kyungbuk (KR); Hyo S. Hyun, Kyungbuk (KR)

(73) Assignee: Neodyne Korea Co. LTD, Seoul (KR)

( * ) Notice: Subject to any disclaimer, the term of this patent is extended or adjusted under 35 U.S.C. 154(b) by 23 days.

(21) Appl. No.: 09/906,425

(22) Filed: Jul. 17, 2001

(65) Prior Publication Data

US 2002/0059714 A1 May 23, 2002

(30) Foreign Application Priority Data

Nov. 21, 2000 (KR) .......................... 2000-69219

(51) Int. Cl.[7] .............................................. H01F 7/06
(52) U.S. Cl. ........................ 29/605; 29/596; 29/598; 29/606; 140/92.1; 140/92.2; 310/179; 310/180; 310/203; 310/204; 242/430; 242/433.1; 242/433.2; 242/445.1
(58) Field of Search ......................... 29/596, 598, 605, 29/606; 140/92.1, 92.2; 310/179, 180, 189, 203, 234; 242/430, 433.1, 433.2, 445.1

(56) References Cited

U.S. PATENT DOCUMENTS 4,459,503 A * 7/1984 Kropp et al. ............... 310/198
4,857,790 A * 8/1989 Kamiyama et al. ......... 310/234
5,044,065 A * 9/1991 Dyke et al. ................... 29/597
5,172,870 A * 12/1992 Van Assema ............... 310/198
5,267,699 A * 12/1993 Lombarbi ................. 242/433.3
5,294,855 A * 3/1994 Mihalko ..................... 310/180

FOREIGN PATENT DOCUMENTS

KR 1020000069219 12/1999

* cited by examiner

Primary Examiner—Peter Vo
Assistant Examiner—Tai Nguyen
(74) Attorney, Agent, or Firm—Park & Sutton LLP; John K. Park

(57) ABSTRACT

A coil-winding method comprises: winding first coil clockwise around first, counterclockwise around second, and clockwise around third swath along mandrel, hooks grouped into swaths; winding second coil clockwise around between first arid second hooks of first to between first and second hooks of second swath, counterclockwise around from between first and second hooks of second to between first and second hooks of third swath, clockwise around between first and second hooks of third to between first and second hooks of first swath; winding third coil clockwise around between second and third hooks of first to between second and third hooks of second swath, counterclockwise around from between second and third hooks of second to between second and third hooks of third swath, clockwise around between second and third hooks of third to between second and third hooks of first swath; and releasing wound coils.

24 Claims, 4 Drawing Sheets

COIL-WINDING METHOD FOR ELECTRIC MOTOR, GENERATOR AND ALTERNATOR

CLAIMING FOREIGN PRIORITY

The applicant claims and requests a foreign priority, through the Paris Convention for the Protection of Industry Property, based on a patent application filed in the Republic of Korea (South Korea) with the filing date of Nov. 21, 2000, with the patent application No. 10-2000-0069219, by the applicant. (See the Attached Declaration)

BACKGROUND OF THE INVENTION

The present invention relates to coil windings for electrically powered motors. More specifically, this invention relates to an improved method of winding coils for electric motors, generators and alternators to substantially simplify and expedite the coil windings.

As is conventionally known, a brushless motor adopting alternating current (AC) and direct current (DC) has an outer stator surrounding an inner rotor in which the rotor is provided to rotate within the stator.

In most electric motors, the stator includes a number of regularly spaced radially oriented teeth along its inner periphery, which define a corresponding number of slots. The teeth and slots extend along the entire axial length of the stator. Through various techniques which are well known to those skilled in the field, electrical windings are positioned in the slots between the teeth from one end of the stator to another, and around the teeth at the opposite ends of the stator. In this manner, the electrical windings are precisely oriented with respect to the rotor so that AC or switched DC voltage applied to the windings will induce a magnetic field which has a known, predetermined orientation. The electromagnetic field is designed to react with permanent magnets or inductive windings on the rotor to turn the rotor in a desired direction.

It can be difficult and time consuming to install the electrical windings into a slotted stator, and a fair amount of complicated machinery has been developed over the years to do this. In addition to the manufacturing difficulties presented by the slotted stator configuration, the presence of the teeth which define the slots creates magnetic discontinuities, which can affect the efficiency of the motor. In addition, the presence of the teeth limits the number of windings which can be positioned in the critical area of the stator adjacent to the rotor. This also adversely affects the efficiency of the motor. If the entire area on the stator which is adjacent to the rotor could be filled with conductors, motor efficiency would increase, and losses due to factors such as hysteresis would be lessened.

U.S. Pat. No. 5,197,180 discloses a method of improving a motor efficiency by securing effective conductors that a motor requires, by filling the entire area of the stator with coils to thereby decrease losses caused by hysterisis.

Referring to FIG. 1 shown herewith, U.S. Pat. No. 5,197,180 provides a mandrel 1 with a hexagonal outer formation. Three coils 2 are wound around the mandrel 1 and the mandrel is removed from the wound coil formation which is then flattened to form a flat two-layered web 2'. Then, the flat web 2' is rolled end-to-end to form a circular shape which can be inserted into a motor and at the same time allow a rotor to be inserted thereinto.

However, the cited coil winding method may incur defectives in the course of coil winding and forming the two-layered flat web, and disadvantageously requires precision devices to prevent incurrence of the defectives. That is, when flattening the coil wound formation to form the flat web 2', the coils 2 may lose an even alignment thereof and be tangled, resulting in critical effect on the motor performance. Further, in the course of rolling the flat web 2 to form the circular shape there is additionally required an extra device and process for adjusting radial measurements of the circular shape to a target size in accordance to a motor, thereby increasing production cost while damaging production efficiency.

SUMMARY OF THE INVENTION

The invention is contrived to overcome the conventional disadvantages. Therefore, it is an object of the present invention to provide a coil winding method for realizing a coil-wound article in a cylindrical formation which is applicable to a stator without deformation of the coil-wound article. Another object is to provide a coil winding method for implementing a high efficiency motor while substantially decreasing production costs and defective rates.

To achieve the above-described objects, a method of forming a coil-wound article for an electric motor, an electric generator, or an electric alternator, according to the present invention, comprises the steps of: winding a first coil by a predetermined number of laps clockwise around a first swath, counterclockwise around a second swath, and clockwise around a third swath of a plurality of hooks correspondingly provided out of a plurality of slots formed along an outer periphery of a mandrel, wherein the hooks are collapsibly protruded from within the mandrel through the slots, wherein the hooks are consecutively grouped into the first, second and third swaths, wherein said each swath at least includes a first hook, a second hook and a third hook; winding a second coil by a predetermined number of laps clockwise around from between the first and second hooks of the first swath to between the first and second hooks of the second swath, counterclockwise around from between the first and second hooks of the second swath to between the first and second hooks of the third swath, and clockwise around from between the first and second hooks of the third swath to between the first and second hooks of the first swath; winding a third coil by a predetermined number of laps clockwise around from between the second and third hooks of the first swath to between the second and third hooks of the second swath, counterclockwise around from between the second and third hooks of the second swath to between the second and third hooks of the third swath, and clockwise around from between the second and third hooks of the third swath to between the second and third hooks of the first swath; and releasing the wound first, second and third coils axially from the mandrel by collapsing the hooks below the outer periphery of the mandrel, thereby forming the coil-wound article.

In a preferred version, there are provided four swaths each having a first to fourth hook, wherein the first step further includes winding counterclockwise a fourth swath of a plurality of hooks correspondingly provided out of a plurality of slots formed along an outer periphery of a mandrel so that the hooks are collapsibly protruded from within the mandrel through the slots, and consecutively grouped into the first, second, third, and fourth swaths.

The method makes intermittent angular rotations either by 120 degrees in case of three swaths each having three hooks or by 90 degrees in case of four swaths each having three hook, in the first, second and third steps so that said each coil winding can be implemented from a single direction.

The advantages of the invention are numerous in that: (1) the coil winding method innovatively simplifies the steps required for forming the coil-wound article applicable to a stator for a motor such as brushless electric motors by substantially disregarding the conventionally required steps, that is, the present invention eliminates the conventional steps for flattening or rolling the coil-wound article; (2) because the simplified coil winding steps are realized by simply releasing the completed coil-wound article from the mandrel and without deformation of the coil-wound article, the coil-wound method of the invention substantially improves production efficiency while significantly decreasing effective rates; and (3) the coil-wound article completed and released from the cylindrical mandrel can be directly assembled to a target stator without requiring adjustment of radius measurements to the target stator, thereby improving productivity for fabricating the coil-wound article and stabilizing magnetic inductivity for the applied stator.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE PREFERRED EMBODIMENTS

Figure 1:
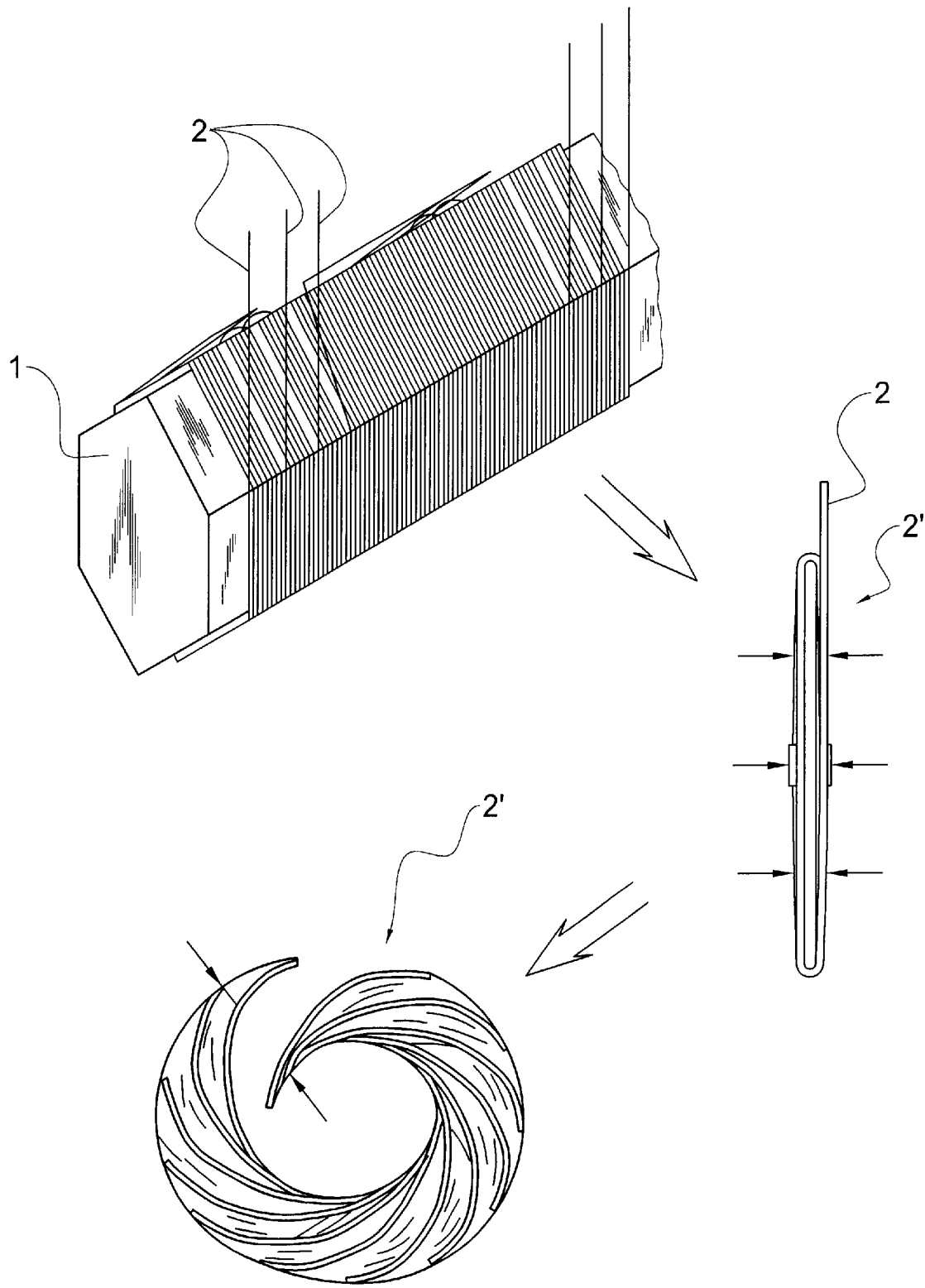
FIG. 1 is a process view showing a method of a conventional coil winding and a deforming of the wound-coils for a motor according to the prior art.
Figure 2:
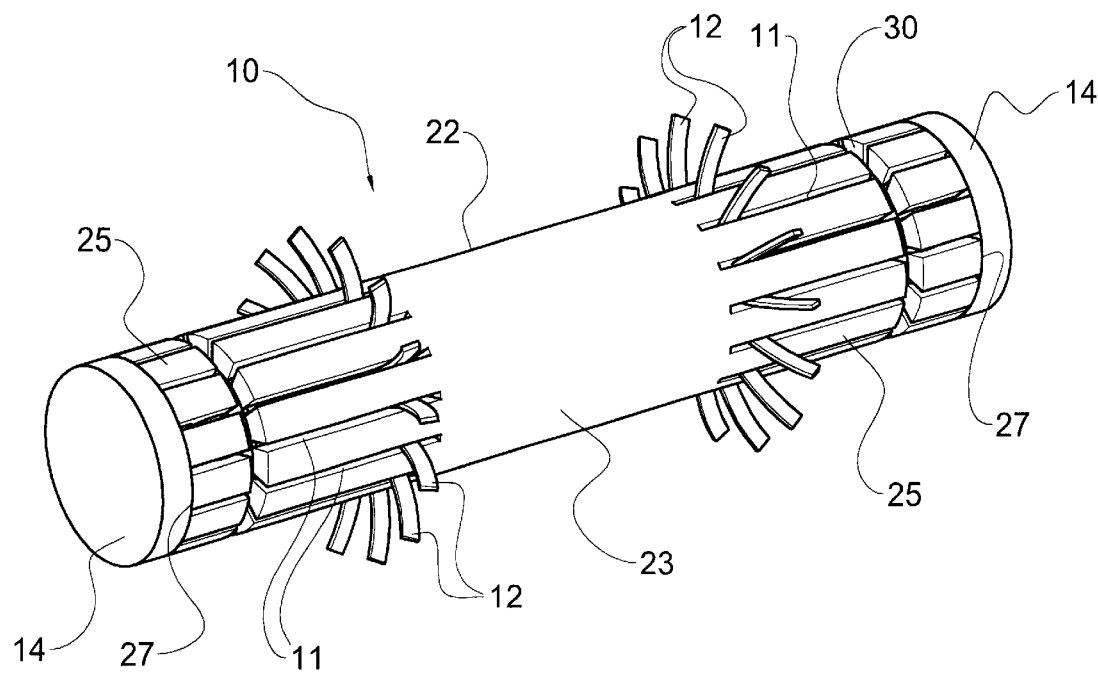
FIG. 2 is a perspective view showing a mandrel according to the present invention.
Figure 3:
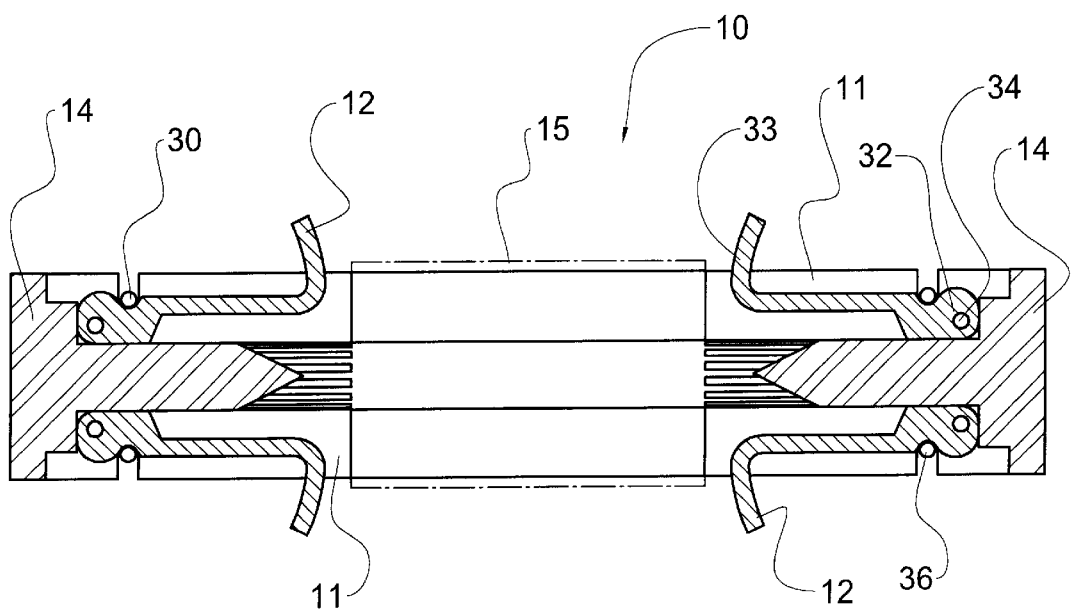
FIG. 3 is an axially taken cross-sectional view of the mandrel in FIG. 2 for a coil winding operation.
Figure 4:
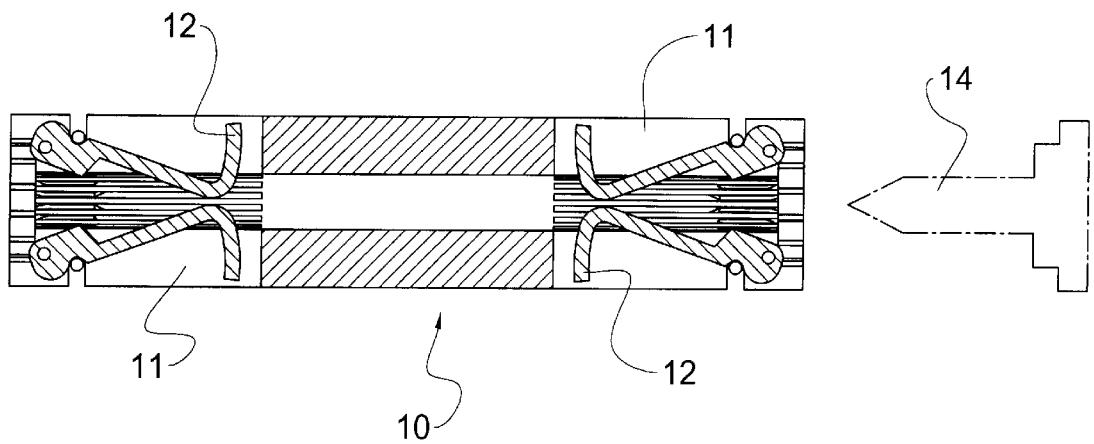
FIG. 4 is an axially taken cross-sectional view of the mandrel in FIG. 2 for an operation to remove the coil-wound article from the mandrel.

As shown in FIGS. 2, 3 and 4, a mandrel 10 for realizing a coil winding method according to the present invention is provided in cylindrical formation. A plurality of slots 11 are formed along an outer periphery 22 of the mandrel 10 which is preferably formed cylindrical. The outer periphery 22 is sectioned into a mid portion 23 and side portions 25. Each slot 11 is radially formed in an axial stretch from each side of the mid portion 23 of the outer periphery 22 toward each end 27 of the mandrel 10. The slots 11 are evenly distanced from one another along the circumference of the mandrel 10. Also, a groove 30 is circularly formed adjacent to each end 27 of the mandrel 10.

A plurality of hooks 12 are provided for insertion into the slots 11. Specifically, each hook 12 has a hole 32 at one end and a hook end 33 crooked upwardly at the other end. Through the hole 32 is flexibly inserted a support ring 34 so that the plurality of hooks 12 are flexibly maintained by the support ring 34. The hooks 12 supported by the support ring 34 are disposed in the slots 11 such that the upwardly crooked portion 33 of each hook 12 can be exposed above the outer periphery 22 of the mandrel 10.

An elastic ring member 36 is provided in and along each groove 30 so as to enable the upwardly crooked portion 33 of each hook 12 to become elastically collapsible from the outer periphery 22 of the mandrel 10. That is, as shown in FIG. 2, each hook 12 can be collapsed below the outer periphery 22 of the mandrel 10 by the elastic ring member 36 when required, and as shown in FIG. 3, each hook end portion 33 can be protruded above the outer periphery 22 of the mandrel through each corresponding slot 11 with the provision of an adjuster 14 through each end 27 of the mandrel 10. In other words, when the adjuster 14 is inserted into each end 27 of the mandrel 10, the upwardly crooked portion 33 of each hook 12 is protruded above the outer periphery 22 of the mandrel 10, and when the adjuster 14 is released from each end 27 of the mandrel 10, the hook end 33 of each hook 12 becomes elastically collapsed below the outer periphery 22 of the mandrel 10.

In such a construction, each hook end 33 of the hooks 12 is utilized to implement a coil winding according to the present invention. Here, it is preferred that each hook end 33 of the hooks 12 is bent over so the bent-over tip of each hook end 33 may lean toward the other end of each hook 12 where the hole 32 is formed therethrough. Eventually, the plurality pairs of hooks 12 are installed in the slots 11 by the support ring 34 and the elastic member 36 each disposed adjacent to each end 27 of the mandrel 10 so as to flexibly maintain the hooks 12 in the slots 11, whereby one of each hook pair 12 can face against the other of the hook pair 12 with the mid portion 23 of the mandrel 10 maintained between each hook pair 12.

Figure 5:
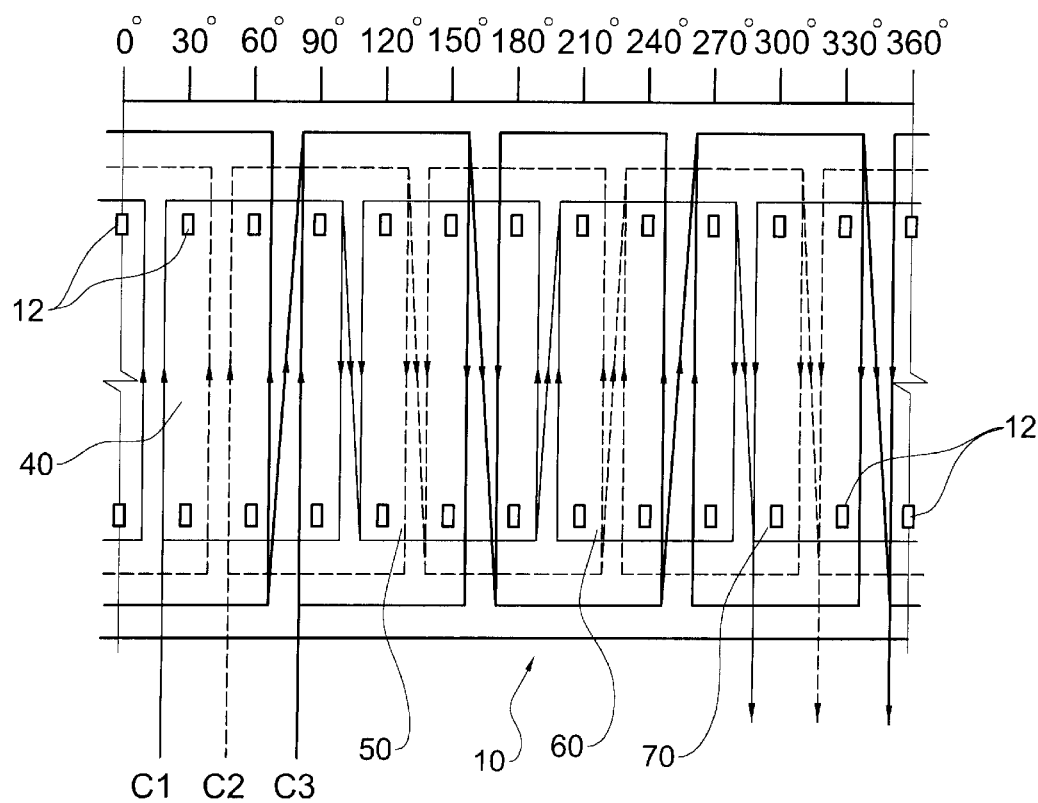
FIG. 5 is a schematic development view of the mandrel to show a coil winding method according to the present invention.
Figure 6:
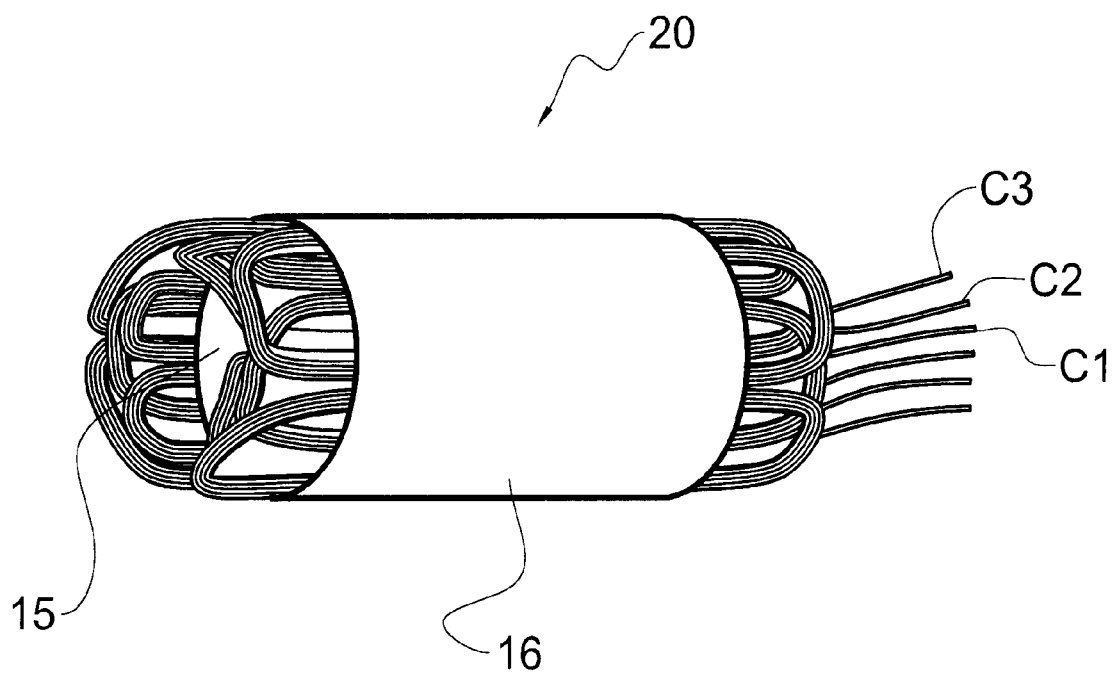
FIG. 6 is a perspective view showing the coil-wound article removed from the mandrel.
Figure 7:
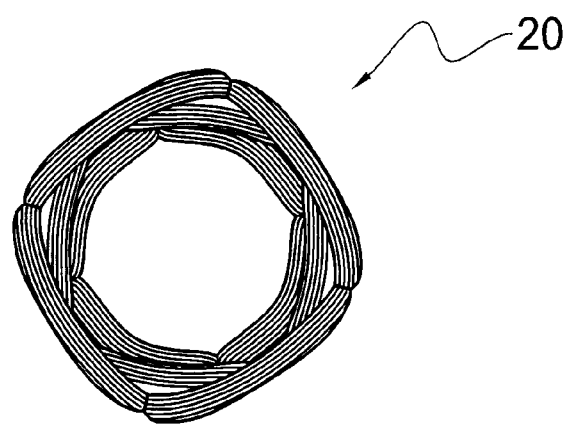
FIG. 7 is a side view of the coil-wound article in FIG. 6.

With reference to FIGS. 5–7 and the mandrel 10 as discussed above, a method of forming a coil-wound article 20 will now be described. The coil-wound article 20 may be utilized for an electric motor, an electric generator, or an electric alternator.

As illustrated in FIG. 5, in order to implement the present invention, the hooks 12 may be consecutively grouped into a first swath 40, a second swath 50, a third swath 60 and a fourth swath 70, where the swaths 40, 50, 60, 70 respectively include either first to third individual hooks or first to third pair hooks from left to right in each swath. The method of forming the coil-wound article 20 according to a preferred embodiment of the invention comprises a first step of winding a first coil C1 by a predetermined number of laps clockwise around the first swath 40, counterclockwise around the second swath 50, clockwise around the third swath 60, and counterclockwise around the fourth swath 70 of the plurality of hooks 12.

A second step of the coil winding method is implemented by winding a second coil C2 by a predetermined number of laps clockwise around from between the first and second hooks of the first swath 40 to between the first and second hooks of the second swath 50, counterclockwise around from between the first and second hooks of the second swath 50 to between the first and second hooks of the third swath 60, clockwise around from between the first and second hooks of the third swath 60 to between the first and second hooks of the fourth swath 70, and counterclockwise around from between the first and second hooks of the fourth swath 70 to between the first and second hooks of the first swath 40.

Then, a third step of the coil winding method is implemented by winding a third coil C3 by a predetermined number of laps clockwise around from between the second and third hooks of the first swath 40 to between the second and third hooks of the second swath 50, counterclockwise around from between the second and third hooks of the second swath 50 to between the second and third hooks of the third swath 60, clockwise around from between the second and third hooks of the third swath 60 to between the second and third hooks of the fourth swath 70, and counterclockwise around from between the second and third hooks of the fourth swath 70 to between the first and second hooks of the first swath 40.

Thereafter, a fourth step of the coil winding method is implemented by releasing the wound first, second and third coils C1, C2, C3 axially from the mandrel 10 by collapsing the hooks 12 below the outer periphery 22 of the mandrel 10, thereby forming the coil-wound article 20.

In another embodiment, the hooks 12 may be grouped in three. That is, the hooks 12 may be consecutively grouped into a first swath 40, a second swath 50, and a third swath 60, where the swaths 40, 50, 60 respectively include at least either first to third individual hooks or first to third pair hooks from left to right in each swath. The method of forming the coil-wound article 20 according to the other preferred embodiment of the invention comprises a first step of winding a first coil C1 by a predetermined number of laps clockwise around the first swath 40, counterclockwise around the second swath 50, and clockwise around the third swath 60 of the plurality of hooks 12.

Successively, a second step of the other embodiment is implemented by winding a second coil C2 by a predetermined number of laps clockwise around from between the first and second hooks of the first swath 40 to between the first and second hooks of the second swath 50, counterclockwise around from between the first and second hooks of the second swath 50 to between the first and second hooks of the third swath 60, and clockwise around from between the first and second hooks of the third swath 60 to between the first and second hooks of the first swath 40.

Then, a third step of the other embodiment is implemented by winding a third coil C3 by a predetermined number of laps clockwise around from between the second and third hooks of the first swath 40 to between the second and third hooks of the second swath 50, counterclockwise around from between the second and third hooks of the second swath 50 to between the second and third hooks of the third swath 60, and clockwise around from between the second and third hooks of the third swath 60 to between the second and third hooks of the first swath 40. Here, the number of laps for coil winding depends upon requirements of a target motor.

Thereafter, as implemented in the first embodiment, a fourth step of the other embodiment is implemented by releasing the wound first, second and third coils C1, C2, C3 axially from the mandrel 10 by collapsing the hooks 12 below the outer periphery 22 of the mandrel 10, thereby forming the coil-wound article 20.

To release the coil-wound article 20 from the mandrel 10, the adjuster 14 removably and elastically inserted in each end portion 27 of the mandrel 10 to sustain the hook ends 33 above the outer periphery 22 of the mandrel 10 is removed from each mandrel end 27, whereby the hooks 12 are elastically collapsed below the outer periphery 22 of the mandrel 10 when required to remove the coil-wound article 20 from the mandrel 10. Consequently, the completed coil-wound article 20 is easily removed from the mandrel 10 by a simple manipulation of the mandrel 10. Here, the elasticity to collapse the hooks 12 into the slots 11 comes from the elastic ring member 36. The ring member 36 may be formed of a rubber material.

For a better performance, the coil winding method according to the present invention makes intermittent angular rotations either by 120 degrees in case of three swaths each having three hooks or by 90 degrees in case of four swaths each having three hook, in the respective first, second and third steps so that each coil winding of coils C1, C2, C3 each being an insulated conductor can be implemented from a single direction.

Preferably, between each hook pair and along the outer periphery of the mandrel is detachably provided a first insulation tape 15. As shown in FIG. 6, a second insulation tape 16 may be partically wrapped around a mid portion of the coil-wound article 20.

An advantage of the invention is that the coil winding method innovatively simplifies the steps required for forming the coil-wound article 20 applicable to a stator for a motor such as brushless electric motors by substantially disregarding the conventionally required steps. That is, the present invention eliminates the conventional steps for flattening or rolling the coil-wound article.

Further, because the simplified coil winding steps are realized by simply releasing the completed coil-wound article from the mandrel 10 and without deformation of the coil-wound article 20, the coil-wound method of the invention substantially improves production efficiency while significantly decreasing effective rates.

Still further, the coil-wound article 20 completed and released from the cylindrical mandrel 10 can be directly assembled to a target stator without requiring adjustment of radius measurements to the target stator, thereby improving productivity for fabricating the coil-wound article and stabilizing magnetic inductivity for the applied stator.

Although the invention has been described in considerable detail with reference to certain preferred versions thereof, other versions are possible by converting the aforementioned construction. Therefore, the scope of the invention shall not be limited by the specification specified above and the appended claims.

What is claimed is:

1. A method of forming a coil-wound article for an electric motor, an electric generator, or an electric alternator, comprising the steps of:

a) winding a first coil by a predetermined number of laps clockwise around a first swath, counterclockwise around a second swath, and clockwise around a third swath of a plurality of hooks correspondingly provided out of a plurality of slots formed along an outer periphery of a mandrel, wherein the hooks are collapsibly protruded from within the mandrel through the slots, wherein the hooks are consecutively grouped into the first, second and third swaths, wherein said each swath at least includes a first hook, a second hook and a third hook;

b) winding a second coil by a predetermined number of laps clockwise between the first and second hooks of the first swath to between the first and second hooks of the second swath, counterclockwise between the first and second hooks of the second swath to between the first and second hooks of the third swath, and clockwise between the first and second hooks of the third swath to between the first and second hooks of the first swath;

c) winding a third coil by a predetermined number of laps clockwise from between the second and third hooks of the first swath to between the second and third hooks of the second swath, counterclockwise between the second and third hooks of the second swath to between the second and third hooks of the third swath, and clockwise between the second and third hooks of the third swath to between the second and third hooks of the first swath; and d) releasing the wound first, second and third coils axially from the mandrel by collapsing the hooks below the outer periphery of the mandrel, thereby forming the coil-wound article.

2. The method of claim 1 wherein the mandrel makes intermittent angular rotations by 120 degrees in the steps a), b) and c) so that said each coil winding can be implemented from a single direction.

3. The method of claim 1 wherein said each slot is formed axial.

4. The method of claim 1 wherein the slots are evenly displaced from each other along the outer periphery of the mandrel.

5. The method of claim 1 wherein said each slot is formed in pair and said each hook is formed in pair.

6. The method of claim 5 wherein said each pair of slots are respectively formed axial.

7. The method of claim 5 wherein between said each hook pair and along the outer periphery of the mandrel is detachably provided a first insulation tape.

8. The method of claim 1 further comprising a step of partially wrapping a second insulation tape around the coil-wound article.

9. The method of claim 1 wherein the mandrel is cylindrical.

10. The method of claim 1 wherein the mandrel further comprises a hook adjuster removably and elastically inserted in each end portion of the mandrel to sustain the hooks above the outer periphery of the mandrel, whereby the hooks are elastically collapsed below the outer periphery of the mandrel when required to remove the coil-wound article from the mandrel so that the completed coil-wound article can be easily removed from the mandrel.

11. The method of claim 1 wherein said each coil is an insulated conductor.

12. The method of claim 1 wherein a second insulation tape is partially wrapped around the coil-wound article.

13. A method of forming a coil-wound article for an electric motor, an electric generator, or an electric alternator, comprising the steps of:

a) winding a first coil by a predetermined number of laps clockwise around a first swath, counterclockwise around a second swath, clockwise around a third swath, and counterclockwise around a fourth swath of a plurality of hooks correspondingly provided out of a plurality of slots formed along an outer periphery of a mandrel, wherein the hooks are collapsibly protruded from within the mandrel through the slots, wherein the hooks are consecutively grouped into the first, second, third, and fourth swaths, wherein said each swath includes a first hook, a second hook and a third hook;

b) winding a second coil by a predetermined number of laps clockwise between the first and second hooks of the first swath to between the first and second hooks of the second swath, counterclockwise between the first and second hooks of the second swath to between the first and second hooks of the third swath, clockwise between the first and second hooks of the third swath to between the first and second hooks of the fourth swath, and counterclockwise between the first and second hooks of the fourth swath to between the first and second hooks of the first swath;

c) winding a third coil by a predetermined number of laps clockwise between the second and third hooks of the first swath to between the second and third hooks of the second swath, counterclockwise between the second and third hooks of the second swath to between the second and third hooks of the third swath, clockwise between the second and third hooks of the third swath to between the second and third hooks of the fourth swath, and counterclockwise between the second and third hooks of the fourth swath to between the second and third hooks of the first swath; and d) releasing the wound first, second and third coils axially from the mandrel by collapsing the hooks below the outer periphery of the mandrel, thereby forming the coil-wound article.

14. The method of claim 13 wherein the mandrel makes intermittent angular rotations by 90 degrees in the steps a), b) and c) so that said each coil winding can be implemented from a single direction.

15. The method of claim 13 wherein said each slot is formed axial.

16. The method of claim 13 wherein the slots are evenly displaced from each other along the outer periphery of the mandrel.

17. The method of claim 13 wherein said each slot is formed in pair and said each hook is formed in pair.

18. The method of claim 17 wherein said each pair of slots are respectively formed axial.

19. The method of claim 17 wherein between said each hook pair and along the outer periphery of the mandrel is detachably provided a first insulation tape.

20. The method of claim 13 further comprising a step of partially wrapping a second insulation tape around the coil-wound article.

21. The method of claim 13 wherein the mandrel is cylindrical.

22. The method of claim 13 wherein the mandrel further comprises a hook adjuster removably and elastically inserted in each end portion of the mandrel to sustain the hooks above the outer periphery of the mandrel, whereby the hooks are elastically collapsed below the outer periphery of the mandrel when required to remove the coil-wound article from the mandrel so that the completed coil-wound article can be easily removed from the mandrel.

23. The method of claim 13 wherein said each coil is an insulated conductor.

24. The method of claim 13 wherein a second insulation tape is partially wrapped around the coil-wound article.

* * * * *